US011872657B2

(12) United States Patent
Sakurai et al.

(10) Patent No.: US 11,872,657 B2
(45) Date of Patent: Jan. 16, 2024

(54) WELDING SYSTEM, AND METHOD FOR WELDING WORKPIECE IN WHICH SAME IS USED

(71) Applicant: Panasonic Intellectual Property Management Co., Ltd., Osaka (JP)

(72) Inventors: Michio Sakurai, Osaka (JP); Narumi Atsuta, Fukuoka (JP); Toru Sakai, Hyogo (JP); Masashi Yoshida, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 430 days.

(21) Appl. No.: 17/353,108

(22) Filed: Jun. 21, 2021

(65) Prior Publication Data

US 2021/0308782 A1    Oct. 7, 2021

Related U.S. Application Data

(63) Continuation of application No. PCT/JP2019/047219, filed on Dec. 3, 2019.

(30) Foreign Application Priority Data

Dec. 19, 2018    (JP) .................................. 2018-237522

(51) Int. Cl.
  *B23K 9/095*    (2006.01)
  *G01B 11/24*    (2006.01)
  (Continued)

(52) U.S. Cl.
  CPC ............ *B23K 9/0956* (2013.01); *G01B 11/24* (2013.01); *G01N 21/8803* (2013.01); *G01N 21/95* (2013.01)

(58) Field of Classification Search
  None
  See application file for complete search history.

(56) References Cited

U.S. PATENT DOCUMENTS 4,931,702 A *    6/1990  Voronin ................... H05B 7/18
                                                  315/344
9,757,816 B2 *   9/2017  Fujita ..................... B23K 26/40
                        (Continued)

FOREIGN PATENT DOCUMENTS

CN        104977305       10/2015
CN        105891215        8/2016
                (Continued)

OTHER PUBLICATIONS

Extended European Search Report dated Jan. 18, 2022 in counterpart EP Application No. 19898030.2.
(Continued)

*Primary Examiner* — Anand P Bhatnagar
(74) *Attorney, Agent, or Firm* — Wenderoth, Lind & Ponack, L.L.P.

(57) ABSTRACT

A welding system includes a welding apparatus and an appearance inspection apparatus. The appearance inspection apparatus includes: a shape measurement unit that measures the shape of a weld; an image processor that generates image data based on data of the shape; a determination unit that determines whether the shape of the weld is good or bad based on the image data and a determination model; and a feedback unit that extracts shape defect information if the result of the determination by the determination unit is negative. An output controller of the welding apparatus corrects a welding condition for a workpiece based on the shape defect information extracted by the feedback unit.

7 Claims, 9 Drawing Sheets

(51) Int. Cl.
    *G01N 21/88*     (2006.01)
    *G01N 21/95*     (2006.01)

(56) References Cited

U.S. PATENT DOCUMENTS

| | | | | |
|---|---|---|---|---|
| 11,364,565 B2* | 6/2022 | Luechinger | | B23K 20/10 |
| 11,545,045 B2* | 1/2023 | Hsu | | B23K 9/0956 |
| 11,767,934 B2* | 9/2023 | Rajagopalan | | F16L 9/02 |
| | | | | 403/272 |
| 2010/0314362 A1* | 12/2010 | Albrecht | | B23K 37/00 |
| | | | | 219/121.63 |
| 2015/0352666 A1* | 12/2015 | Fujita | | B23K 26/402 |
| | | | | 219/121.61 |
| 2016/0193680 A1* | 7/2016 | Pesme | | B23K 31/125 |
| | | | | 219/130.01 |
| 2016/0193681 A1* | 7/2016 | Pesme | | B23K 9/1274 |
| | | | | 219/136 |
| 2023/0129188 A1* | 4/2023 | Hsu | | H04L 67/10 |
| | | | | 706/12 |
| 2023/0274407 A1* | 8/2023 | Kommareddy | | G06V 10/764 |
| | | | | 382/141 |
| 2023/0277150 A1* | 9/2023 | Stewart | | A61B 6/025 |
| | | | | 378/1 |
| 2023/0330784 A1* | 10/2023 | Asai | | B25J 9/1653 |
| | | | | 228/103 |

FOREIGN PATENT DOCUMENTS

| | | |
|---|---|---|
| CN | 108776964 | 11/2018 |
| JP | 05-087539 | 4/1993 |
| JP | 7-72909 | 8/1995 |
| JP | 7-241673 | 9/1995 |
| JP | 2007-155578 | 6/2007 |
| JP | 2010-253538 | 11/2010 |
| JP | 2012-037487 | 2/2012 |
| JP | 5758090 | 8/2015 |

OTHER PUBLICATIONS

Mayr, Andreas et al., "Evaluation of Machine Learning for Quality Monitoring of Laser Welding Using the Example of the Contacting of Hairpin Windings", 2018 8th International Electric Drives Production Conference (EDPC), Dec. 4, 2018, pp. 1-7, XP033526174.

Khumaidi, Agus et al., "Welding Defect Classification Based on Convolution Neural Network (CNN) and Gaussian Kernel", 2017 International Seminar on Intelligent Technology and Its Application (ISITIA), Aug. 28, 2017, pp. 261-265, XP033272611.

First Examination Report of India dated Jan. 11, 2023 in corresponding Indian Patent Application No. 202147031139, with English translation.

International Search Report dated Feb. 25, 2020 in International (PCT) Application No. PCT/JP2019/047219 with English translation.

* cited by examiner

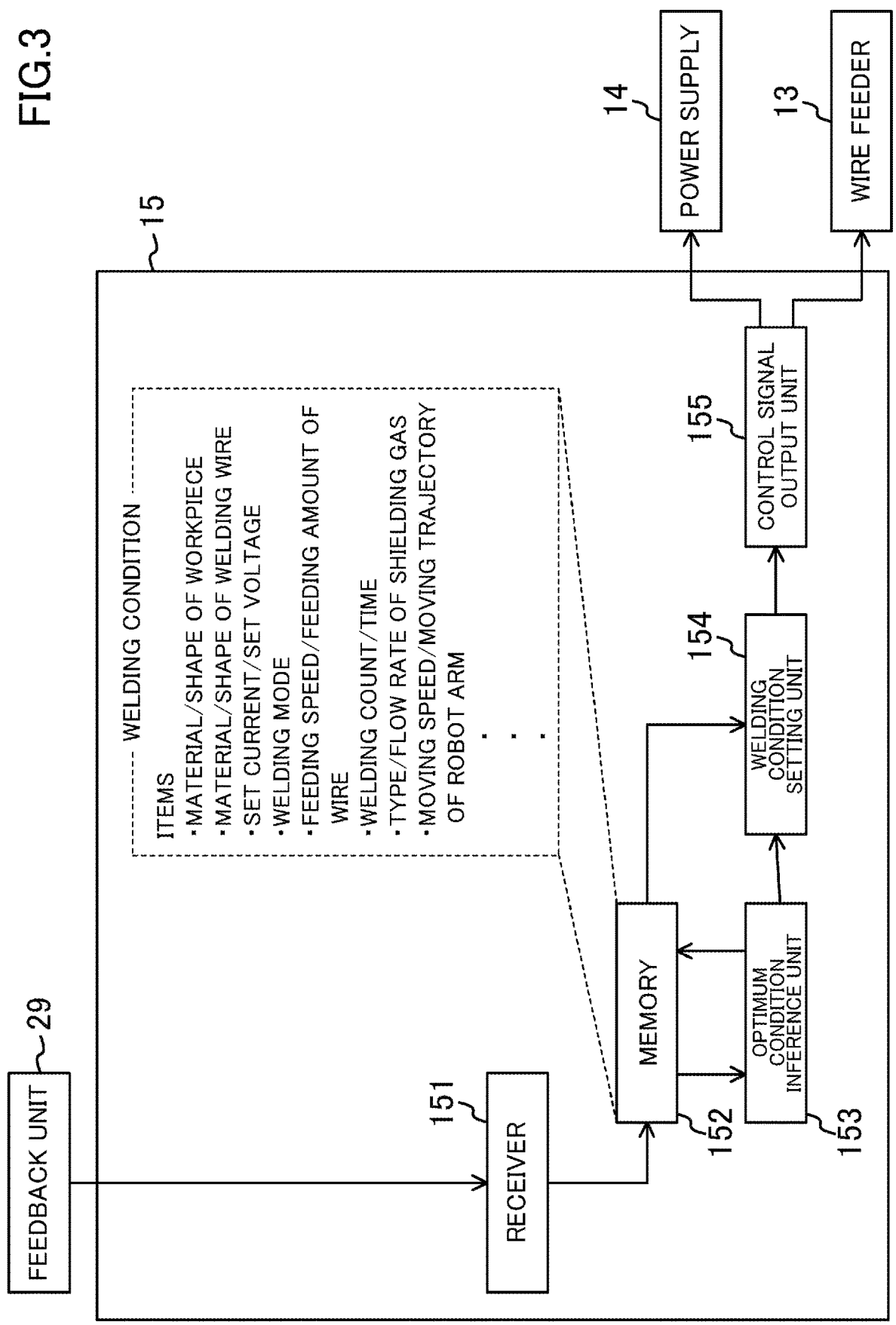

WELDING SYSTEM, AND METHOD FOR WELDING WORKPIECE IN WHICH SAME IS USED

CROSS-REFERENCE TO RELATED APPLICATIONS

This is a continuation of International Application No. PCT/JP2019/047219 filed on Dec. 3, 2019 which claims priority to Japanese Patent Application No. 2018-237522 filed on Dec. 19, 2018. The entire disclosures of these applications are incorporated by reference herein.

BACKGROUND

The present invention relates to a welding system and a method for welding a workpiece using the welding system.

The shape of a weld has often been visually inspected by an operator, and the number of man-hours for the inspection has been a problem. The inspection result varies depending on the operator in charge of the inspection, and predetermined weld quality could not be guaranteed in some cases.

Under these circumstances, a technique of inspecting the shape of the weld using an appearance inspection apparatus having a shape measurement sensor has been proposed. For example, according to a method disclosed in Japanese Unexamined Patent Publication No. 2012-037487, slit light from a laser light source is projected to scan a weld of a workpiece, and an image of an obtained shape line is captured by a measurement camera. Based on the captured image, a three-dimensional shape of the weld is acquired as point group data, and a desired cross-sectional shape of the weld is obtained from the point group data.

SUMMARY

In a welding process, a workpiece is welded under a preset welding condition, and an appearance inspection is done by a method as disclosed by, for example, Japanese Unexamined Patent Publication No. 2012-037487. Then, a welder or a system administrator manually corrects the welding condition by reflecting the result of the inspection.

The optimum condition for welding the workpiece varies depending on, for example, changes in the state of the workpiece, the state of welding equipment, and a welding environment.

However, it has been difficult for the welder to correct the welding condition to the optimum condition in accordance with not only the result of the appearance inspection, but also the changes in the state of the workpiece and the state of the welding equipment. Therefore, when the preset welding condition deviates from the optimum one, a welding failure occurs. As the types of the workpiece to be welded and the shapes of the weld diversify, it has been difficult for the welder to delicately correct the welding condition for each type of the workpiece.

The present invention has been made in view of the foregoing background, and an object of the present invention is to provide a welding system capable of automatically and accurately correcting the welding condition, and a method for welding a workpiece using the welding system.

In order to achieve the object, the present invention is directed to a welding system including: a welding apparatus that welds a workpiece; and a appearance inspection apparatus that inspects an appearance of a weld of the workpiece. The appearance inspection apparatus at least includes: a shape measurement unit that measures a shape of the weld; an image processor that generates image data of the weld based on data of the shape measured by the shape measurement unit; a determination unit that determines whether the shape of the weld is good or bad based on the image data read from the image processor; and a feedback unit that extracts shape defect information including a defect mode of the weld and a size and position of the shape defect in the weld based on a result of the determination by the determination unit and the image data read from the image processor. The welding apparatus at least includes: a welding head that applies heat to the workpiece; and an output controller that controls a welding output of the welding head. If the determination unit has determined that the shape of the weld is bad, the output controller corrects a welding condition for the workpiece based on the shape defect information extracted by the feedback unit.

The welding system configured in this manner can automatically and accurately correct the welding condition for the workpiece based on the result of the inspection by the appearance inspection apparatus.

The present invention is also directed to a method for welding a workpiece using the welding system. The method includes: a first welding step of welding a predetermined portion of the workpiece using the welding apparatus under a predetermined welding condition; and a shape determination step of determining whether a shape of a weld of the workpiece is good or bad using the appearance inspection apparatus after the end of the first welding step. The method further includes, if the result of the determination in the shape determination step is negative: a shape defect information extraction step of extracting the shape defect information of the weld; a welding condition correction step of correcting the welding condition based on the shape defect information; and a second welding step of welding a different portion of the workpiece or the predetermined portion of a different workpiece using the welding apparatus under the corrected welding condition.

According to this method, the welding condition for the workpiece is corrected based on the result of the inspection by the appearance inspection apparatus, and the workpiece is welded under the corrected welding condition. This can reduce poor welding of the workpiece, and can improve weld quality.

The welding system of the present invention can automatically and accurately correct the welding condition for the workpiece. The method for welding the workpiece of the present invention can reduce poor welding of the workpiece, and can improve the weld quality.

BRIEF DESCRIPTION OF THE DRAWINGS

FIG. 3 is a functional block diagram of an output controller of a welding apparatus.

DETAILED DESCRIPTION

Embodiments of the present invention will be described in detail with reference to the drawings. The following description of advantageous embodiments is a mere example in nature, and is not at all intended to limit the scope, applications, or use of the present invention.

First Embodiment

[Configuration of Welding System]

Figure 1:
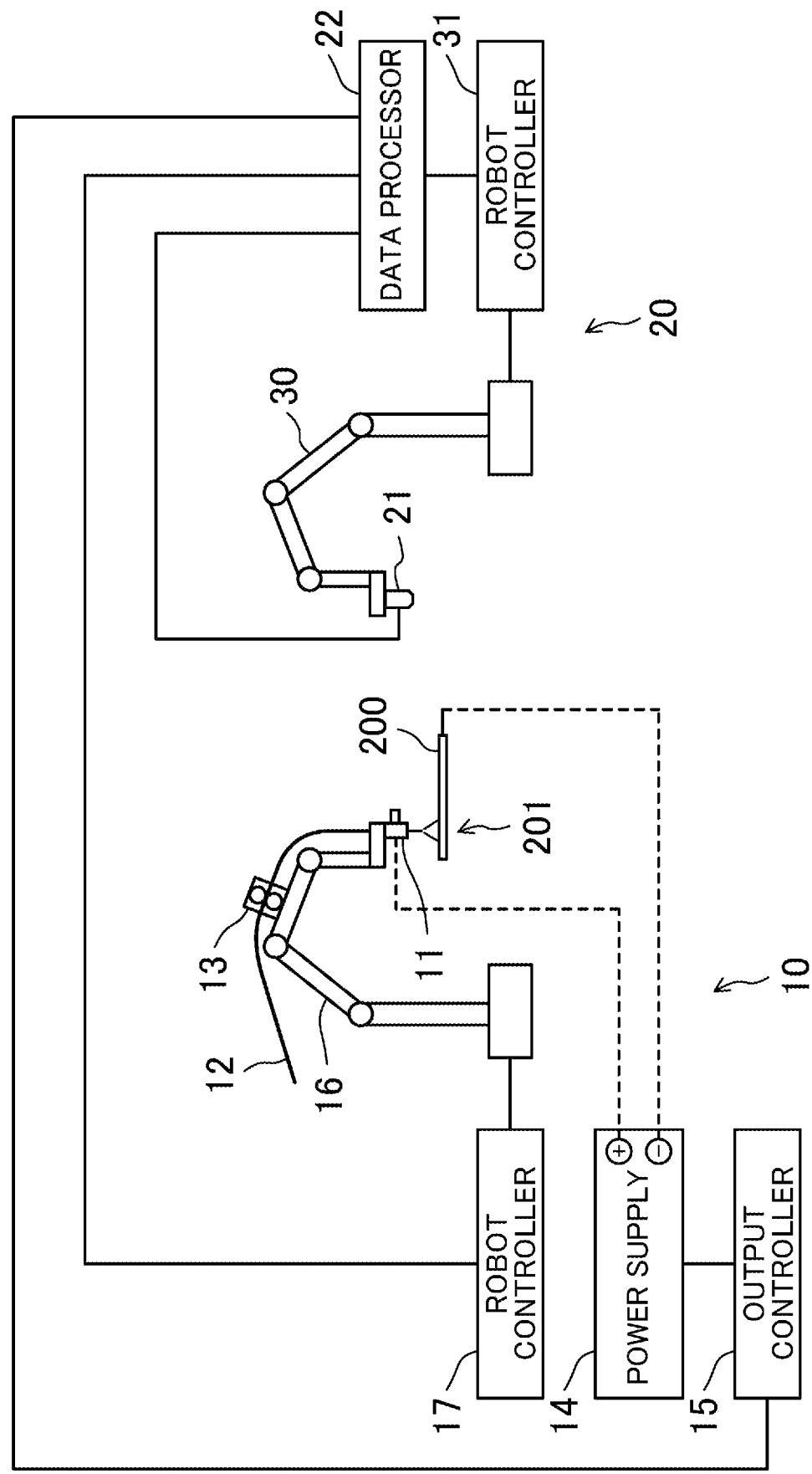
FIG. 1 is a schematic view illustrating a configuration of a welding system according to a first embodiment of the present invention.

FIG. 1 shows a configuration of a welding system according to the present embodiment. A welding system 100 includes a welding apparatus 10 and an appearance inspection apparatus 20.

The welding apparatus 10 includes a welding torch 11, a wire feeder 13, a power supply 14, an output controller 15, a robot arm 16, and a robot controller 17. When electric power is supplied from the power supply 14 to a welding wire 12 held by the welding torch 11, arc is generated between the tip of the welding wire 12 and a workpiece 200, and heat is applied to the workpiece 200, thereby performing arc welding. Although the welding apparatus 10 includes other components and equipment such as a pipe and a gas cylinder for supplying shielding gas to the welding torch 11, such components are not illustrated and described for convenience of explanation.

The output controller 15 is connected to the power supply 14 and the wire feeder 13, and controls a welding output of the welding torch 11, i.e., the electric power supplied to the welding wire 12 and power supply time, according to predetermined welding conditions. Further, the output controller 15 controls the feeding speed and amount of the welding wire 12 fed from the wire feeder 13 to the welding torch 11. The welding conditions may be directly input to the output controller 15 via an input unit (not shown), or may be selected from a welding program read from a recording medium or the like.

The robot arm 16, which is a known articulated robot, holds the welding torch 11 at the tip, and is connected to the robot controller 17. The robot controller 17 controls the operation of the robot arm 16 so that the tip of the welding torch 11, i.e., the tip of the welding wire 12 held by the welding torch 11, moves to a desired position while drawing a predetermined welding trajectory.

The output controller 15 corrects a welding condition for the workpiece 200 based on the result of the extraction by a feedback unit 29 (see FIG. 2A) of the appearance inspection apparatus 20. This will be described in detail later.

The appearance inspection apparatus 20 includes a shape measurement unit 21, a data processor 22, a robot arm 30, and a robot controller 31. The shape measurement unit 21 is attached to the robot arm 30, and measures the shape of a weld 201 of the workpiece 200. The robot controller 31 receives a signal acquired by the shape measurement unit 21 and processed by the data processor 22, and controls the operation of the robot arm 30 so that the shape measurement unit 21 moves to a desired position of the workpiece 200. The configuration of the data processor 22 will be described in detail later.

FIG. 1 illustrates an arc welding apparatus as the welding apparatus 10, but the welding apparatus 10 is not particularly limited thereto. For example, the welding apparatus 10 may be a laser welding apparatus. In this case, in place of the welding torch 11, a laser head (not shown) connected to a laser oscillator (not shown) via an optical fiber (not shown) is attached to and held by the robot arm 16. In the following description, the welding torch 11 and the laser head may be collectively referred to as a welding head 11.

[Configuration of Appearance Inspection Apparatus]

Figure 2A:
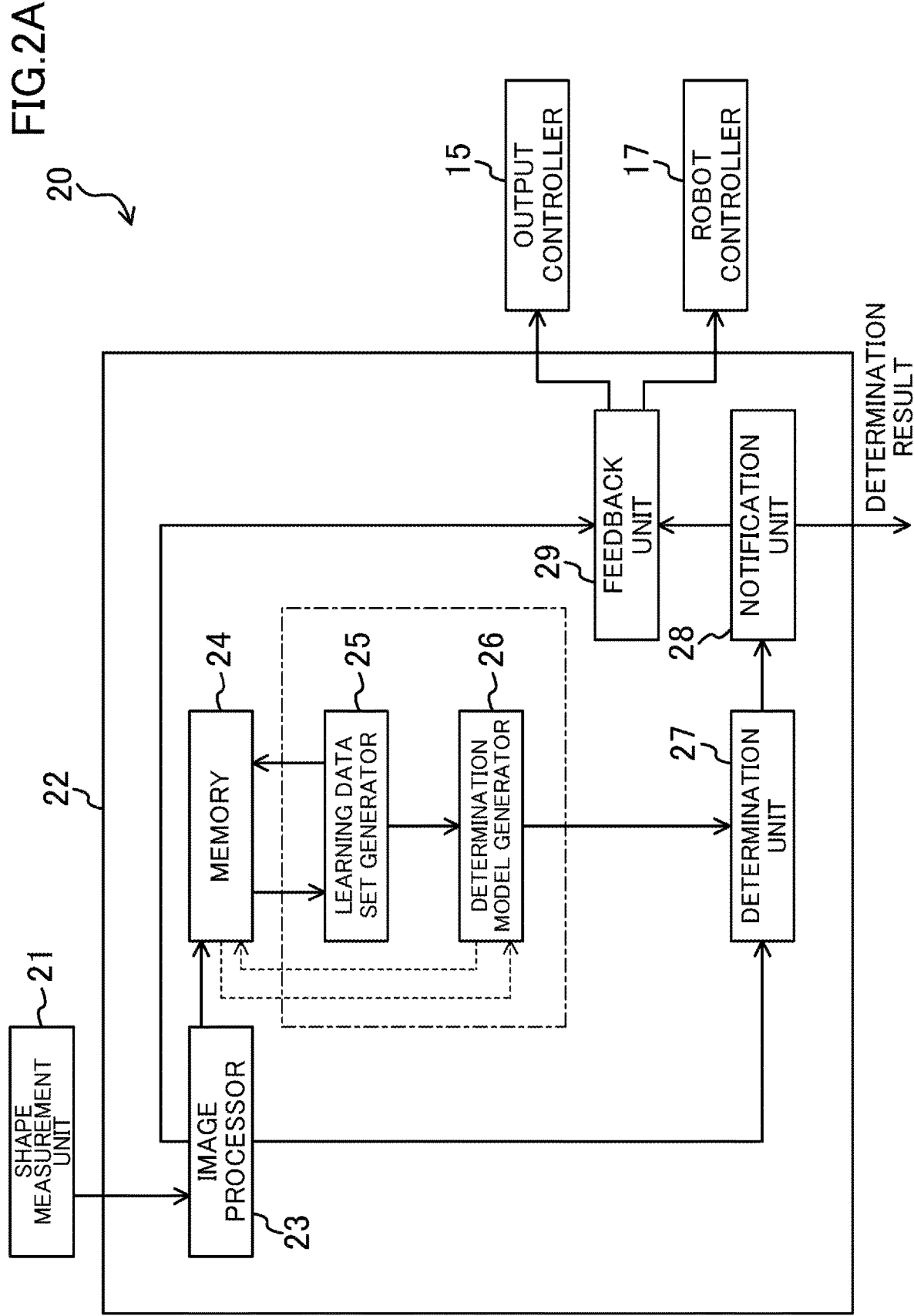
FIG. 2A is a functional block diagram of an appearance inspection apparatus.
Figure 2B:
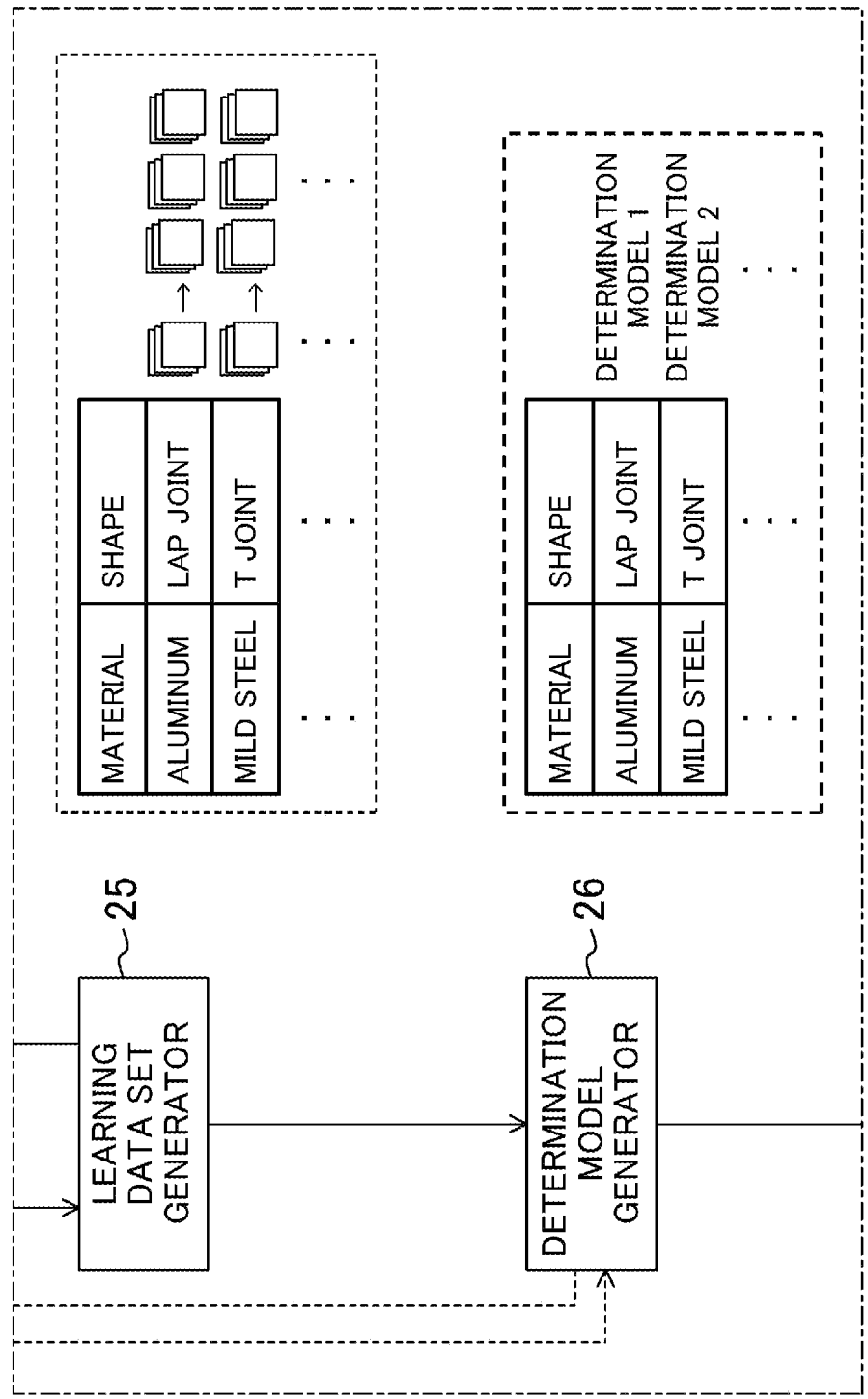
FIG. 2B is part of the functional block diagram of the appearance inspection apparatus.

FIG. 2A shows a functional block diagram of the appearance inspection apparatus, and FIG. 2B shows part of the functional block diagram. Among the functional blocks shown in FIG. 2A, FIG. 2B shows details of a learning data set generator 25 and a determination model generator 26 enclosed with a dash-dotted line. The data processor 22 includes a plurality of functional blocks, namely, an image processor 23, a memory 24, a learning data set generator a determination model generator 26, a determination unit 27, a notification unit 28, and a feedback unit 29. The data processor 22 is generally configured as a personal computer, and executes software implemented on a central processing unit (CPU) or a graphics processing unit (GPU) to realize the plurality of functional blocks in the data processor 22.

The shape measurement unit 21 has a known configuration, and is, for example, a three-dimensional shape measurement sensor including a laser light source (not shown) capable of scanning the surface of the workpiece 200, and a camera (not shown) that captures an image of a reflection trajectory (will be hereinafter referred to as a shape line) of laser light projected onto the surface of the workpiece 200. The shape measurement unit 21 scans the whole weld 201 of the workpiece 200 with the laser light, and captures an image of the laser light reflected from the weld 201 with the camera, thereby measuring the shape of the weld 201. The shape measurement unit 21 is configured to measure the shape of not only the weld 201, but also the periphery thereof within a predetermined range. This is for determining the presence or absence of spatters 204 and smuts 206 described later (see FIG. 4A). The camera has a CCD or CMOS image sensor as an imaging device. The shape measurement unit 21 is not particularly limited to have the above-described configuration, and may be configured in a different manner.

The image processor 23 receives the shape data acquired by the shape measurement unit 21, and converts the shape data into image data. For example, the image processor 23 acquires point group data of the shape line captured by the shape measurement unit 21. Further, the image processor 23 corrects the inclination and distortion of a base portion of the weld 201 with respect to a predetermined reference plane, e.g., a surface on which the workpiece 200 is placed, by statistical processing of the point group data, and generates the image data about the shape of the weld 201. In addition, the image processor 23 may perform, for example, edge enhancement correction by enhancing the periphery of the weld 201 to emphasize the shape and position of the weld 201.

The image processor 23 has the function of removing noise from the data acquired by the shape measurement unit

21. A reflection factor of the laser light emitted from the shape measurement unit 21 varies depending on the material of the workpiece 200. Thus, if the reflection factor is too high, halation or the like occurs to cause noise, and the image data such as the point group data cannot be properly generated in some cases. For this reason, the image processor 23 is configured to perform noise filtering processing on software. The noise can also be removed by providing the shape measurement unit 21 itself with an optical filter (not shown). Combined use of the optical filter and the filtering processing on the software can provide high quality image data. This can improve the quality of a determination model of a learning data set to be described later, and whether the shape of the weld 201 is good or bad can be determined with high accuracy.

The image processor 23 extracts feature values of the image data in accordance with the shape of the workpiece 200 or inspection items for the shape of the weld 201. In this case, one or more feature values corresponding to one or more inspection items are extracted from a piece of image data. The extracted feature values are associated with the image data for use in subsequent data processing. The feature values are particular specifications extracted from the image data. Typical examples thereof include a length, width, and height from a reference plane of the weld 201, and a difference in length, width, and height between a plurality of points in the weld 201. However, the feature values are not particularly limited to such examples, and are appropriately set according to the details to be evaluated by the inspection items.

The memory 24 stores image data of welds 201 of different workpieces 200 processed before welding the workpiece 200 to be evaluated. The memory 24 also stores sample image data experimentally acquired before actual welding of the workpiece 200. The sample image data includes non-defective data about a good shape of the weld 201 to be evaluated, and defective data about a shape with some defects. Needless to say, the image data of the weld 201 of the different workpiece 200 and the image data of the weld 201 of the workpiece 200 to be evaluated are acquired with respect to a similar weld 201 of the workpiece 200 having the same shape and being made of the same material.

The learning data set generator 25 reads the image data generated by the image processor 23 and stored in the memory 24, and classifies the data by material and shape of the workpiece 200. The image data may be classified by inspection item of the weld 201. In this case, the same image data may be contained in different inspection items. The learning data set generator 25 generates a learning data set for each material and shape of the workpiece 200 based on the feature value associated with the image data, i.e., generates a group of learning data which is input to a determination model described later and improves determination accuracy of the determination model. For example, the materials and shapes of the workpiece 200 are sorted into a matrix to determine classification categories, and the learning data sets are classified in correspondence with the categories (see FIG. 2B). Examples of the shapes of the workpiece 200 include a butt-shaped butt joint with butted plates against each other, a lap-shaped lap joint with stacked plates, a T joint, and a cruciform joint.

Regarding the inspection items of the weld 201 set for each material and shape of the workpiece 200, the determination model generator 26 generates a determination model based on a criterion set for each inspection item. The generated determination model is represented as, for example, a combination of two or more discriminators each of which is weighed. The determination model is represented, for example, by a convolutional neural network (CNN).

The determination model generator 26 inputs, among the plurality of learning data sets, a learning data set corresponding to each material and shape of the workpiece 200 to each of the determination models generated for each material and shape of the workpiece 200, and repeats learning, thereby improving the determination accuracy of each of the determination models. In this case, the determination models are generated according to the classification categories shown in FIG. 2B. The learning is repeated until the accuracy rate, recall rate, and precision of the determination model satisfy preset values. For the generation of the determination model, the non-defective data and the-defective data in the sample image data are appropriately selected and used according to the inspection items. This can shorten time required to generate the determination model, and can provide the determination model with high accuracy. Likewise, for the generation of the determination model for each inspection item of the weld 201, the non-defective data and the defective data in the sample image data are appropriately selected and used according to the inspection items. This can shorten the time required to generate the determination model, and can provide the determination model with high accuracy.

The determination unit 27 determines whether the shape of the weld 201 is good or bad, i.e., whether the shape satisfies a predetermined criterion, based on the image data of the weld 201 generated by the image processor 23 and the determination model which is one of the determination models generated by the determination model generator 26 and corresponds to the selected inspection item.

However, as will be described later, there are a wide variety of shape defect modes. Therefore, in practice, the shape defect mode of an abnormal shape portion included in the image data is calculated in terms of probability. If the probability is equal to or more than a predetermined value, the portion is determined to have a shape defect. For example, when the image data is determined to contain a shape defect, the probability that the type of the shape defect is spatters 204 (see FIG. 4A), which is calculated in consideration of, e.g., the shape, size, and/or position of the portion, is shown on a display unit (not shown). If the probability is 70% or more, the shape defect is determined to be the spatters 204. A threshold value for the determination and a display format can be arbitrarily set. For example, the shape defect may be displayed in red if recognized as the spatters 204, or in yellow if recognized as a hole 202 (see FIG. 4A). If the presence or absence and upper limit number of the spatters 204 are set as the inspection items, a portion recognized as the spatters 204 may be displayed in a color different from its background, and the probability that the portion is the spatters 204 may be classified by color. For example, the probability of 30% or less may be colored in green, and the probability of 70% or more may be colored in red. Needless to say, this classification of the probability ranges by color and the definition of the colors can be arbitrarily set. If the size of the spatters 204 is also included in the criterion for determining whether the shape is good or bad, it goes without saying that the size of the spatters 204 calculated based on the image data is compared with the criterion to determine whether the shape is good or bad.

Since there are various inspection items for the shape of the weld 201, determination of whether the shape is good or bad is performed for each inspection item, and final quality determination is performed only when the shape has passed all the inspection items for which the determination is necessary.

The notification unit 28 is configured to notify the feedback unit 29, a welder, or a system administrator of the result of the determination by the determination unit 27. For the notification, the determination result may be shown on a display unit (not shown) of the welding system 100 and/or output from a printer (not shown). If it is enough to simply notify the final determination result, voice notifying the result may be output from a voice output unit which is not shown. In a preferred embodiment, the notification unit 28 notifies not only the final determination result, but also the determination result for each inspection item. By doing so, the welder or the system administrator can specifically know what kind of failure has occurred at the weld 201.

The feedback unit 29 is configured to extract information about a defect mode of the weld 201 and a position and size of the shape defect, which will be described later (and may be hereinafter collectively referred to as shape defect information), based on the result of the determination by the determination unit 27 and the image data read from the image processor 23. Specifically, the feedback unit 29 is configured to extract the shape defect information based on the image data read from the image processor 23 when the shape of the weld 201 is determined to be bad. Further, the feedback unit 29 is configured to output the extracted shape defect information and the result of the determination by the determination unit 27 to the output controller 15 or robot controller 17 of the welding apparatus 10.

If the result of the determination by the determination unit 27 is positive, i.e., the shape of the weld 201 is determined to be good, the welding system 100 continuously welds a portion 201 to be welded next of the same workpiece 200, or a similar portion 201 to be welded of a next workpiece 200.

If the result of the determination by the determination unit 27 is negative, i.e., the shape of the weld 201 is determined to be bad, the output controller 15 stops the welding output of the welding torch 11, and the robot controller 17 stops the operation of the robot arm 16.

[Configuration of Output Controller of Welding Apparatus]

FIG. 3 is a functional block diagram of an output controller of a welding apparatus. The output controller 15 includes a plurality of functional blocks, namely, a receiver 151, a memory 152, an optimum condition inference unit 153, a welding condition setting unit 154, and a control signal output unit 155. In general, software implemented on a central processing unit (CPU) or a micro controller unit (MCU) is executed to realize the plurality of functional blocks of the output controller 15.

The receiver 151 receives the result of the determination by the determination unit 27 and the shape defect information from the feedback unit 29 of the appearance inspection apparatus 20. The feedback unit 29 and the receiver 151 may communicate wirelessly or via wires.

The memory 152 stores preset welding conditions for the workpiece 200. The welding conditions refer to a set of a plurality of conditions for operating the welding apparatus 10, such as the material and thickness of the workpiece 200, the material and diameter of the welding wire 12, and the type and flow rate of shielding gas. Examples of the conditions include a set current which is a set mean value of a welding current, a set voltage which is a set mean value of a welding voltage, a feeding speed and amount of the welding wire 12, and a count and time of welding. In addition, the conditions include, for example, a welding mode such as TIG welding, MAG welding, or pulse welding, and a moving speed and time of the robot arm 16. Note that these conditions are merely examples, and may be appropriately varied in accordance with the type of the welding. The memory 152 stores a plurality of welding conditions experimentally acquired in accordance with the material and shape of the workpiece 200.

The memory 152 may be present outside the output controller 15. For example, data may be exchanged between the output controller 15 and the memory 152 via the receiver 151. The memory 152 may be an external server, for example.

If the determination unit 27 has determined that the shape of the weld 201 is bad, the optimum condition inference unit 153 performs machine learning on the welding condition used to weld the workpiece 200 based on the shape defect information extracted by the feedback unit 29, and corrects the welding condition to the optimum condition for welding the workpiece 200. A plurality of learning models used for the machine learning corresponding to each or some of the plurality of welding conditions stored in the memory 152 are constructed in the optimum condition inference unit 153. Each of the learning models is represented as, for example, a combination of two or more discriminators each of which is weighed. The determination model is represented, for example, by a convolutional neural network (CNN).

The optimum condition inference unit 153 is configured to store the corrected welding conditions in the memory 152. Configuration information of the learning models that have completed predetermined learning may be stored in the memory 152. In this case, for the correction of a predetermined welding condition, the configuration information of a corresponding learning model may be read from the memory 152, and the learning model may be reconstructed by the optimum condition inference unit 153.

The welding condition setting unit 154 sets a corresponding condition from a plurality of welding conditions stored in the memory 152 according to the material and shape of the workpiece 200 to be welded. In this case, if there is no welding record of the workpiece 200 to be welded or if the welding condition has not been corrected, the preset welding condition is set. If the welding condition for the workpiece 200 to be welded has been corrected, the corrected welding condition is set. When the workpiece 200 is welded under the same condition after the correction of the welding condition, the corrected welding condition may be directly read from the optimum condition inference unit 153 to the welding condition setting unit 154.

The control signal output unit 155 outputs a control signal to the wire feeder 13 and the power supply 14 according to the welding condition set by the welding condition setting unit 154 to control electric power supplied to the welding wire 12, time of supplying the electric power, and the feeding speed and amount of the welding wire 12.

[Procedure for Welding Workpiece]

Figure 4A:
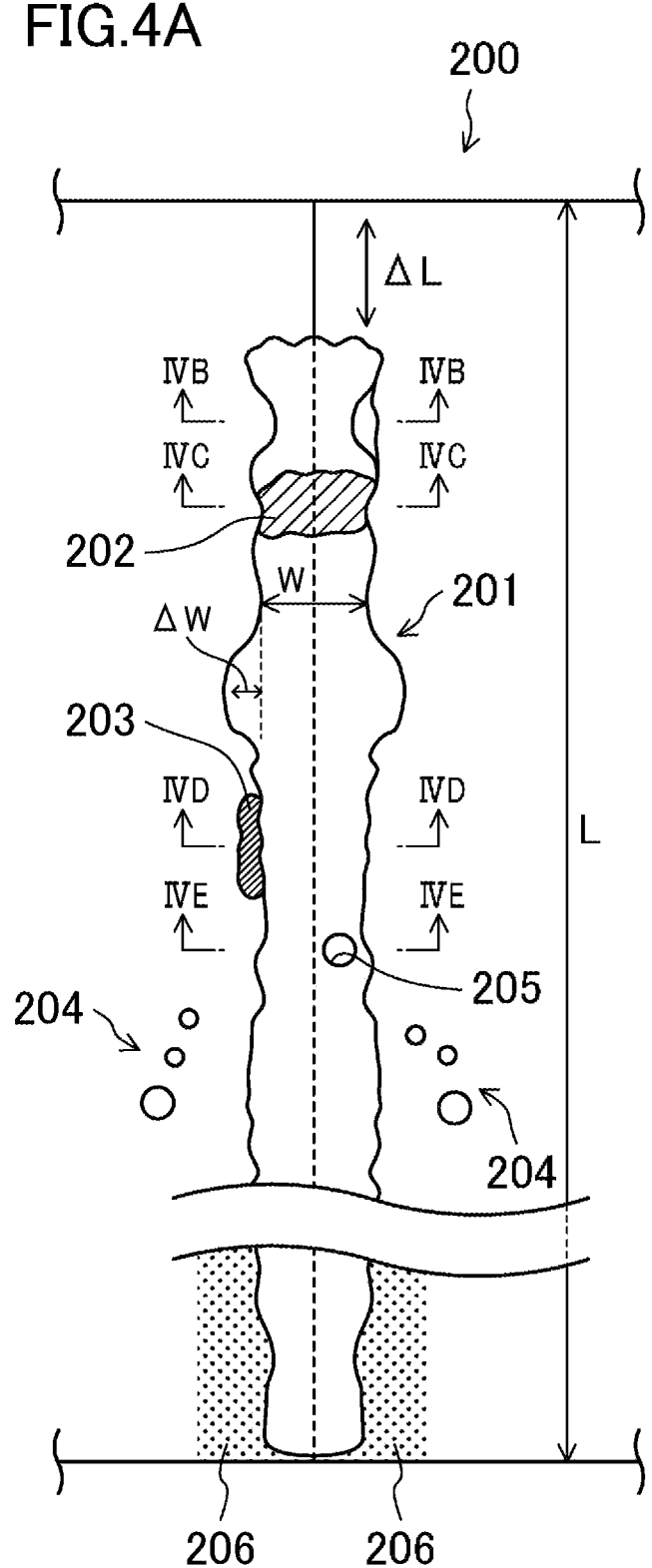
FIG. 4A is a schematic plan view illustrating an example of defect modes of a weld.
Figure 4B:
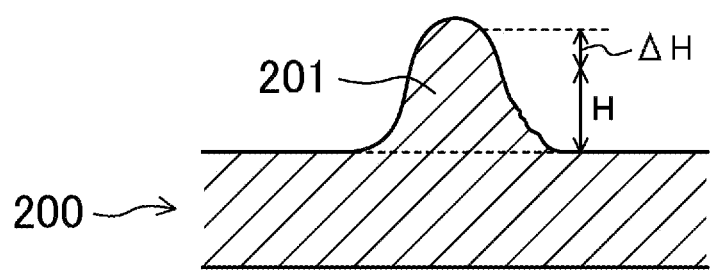
FIG. 4B is a schematic cross-sectional view taken along line IVB-IVB in FIG. 4A.
Figure 4C:
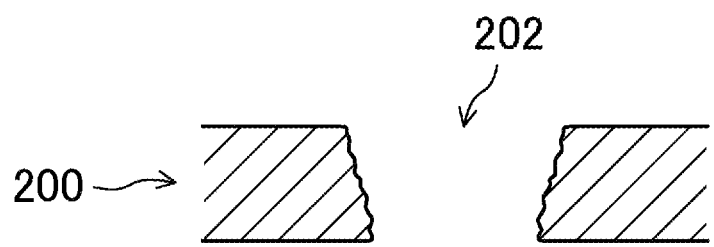
FIG. 4C is a schematic cross-sectional view taken along line IVC-IVC in FIG. 4A.
Figure 4D:
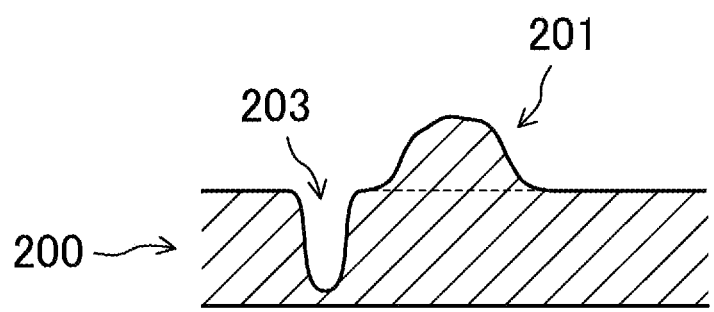
FIG. 4D is a schematic cross-sectional view taken along line IVD-IVD in FIG. 4A.
Figure 4E:
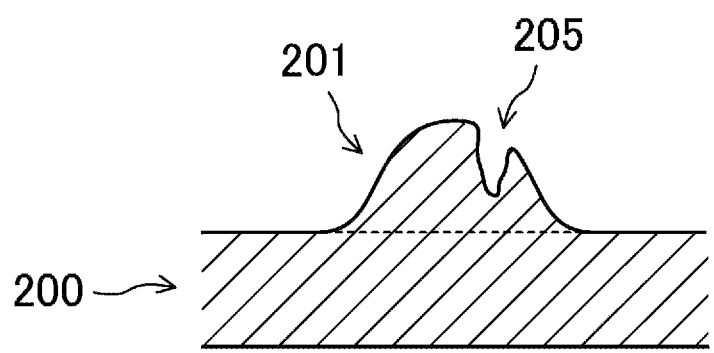
FIG. 4E is a schematic cross-sectional view taken along line IVE-IVE in FIG. 4A.
Figure 5:
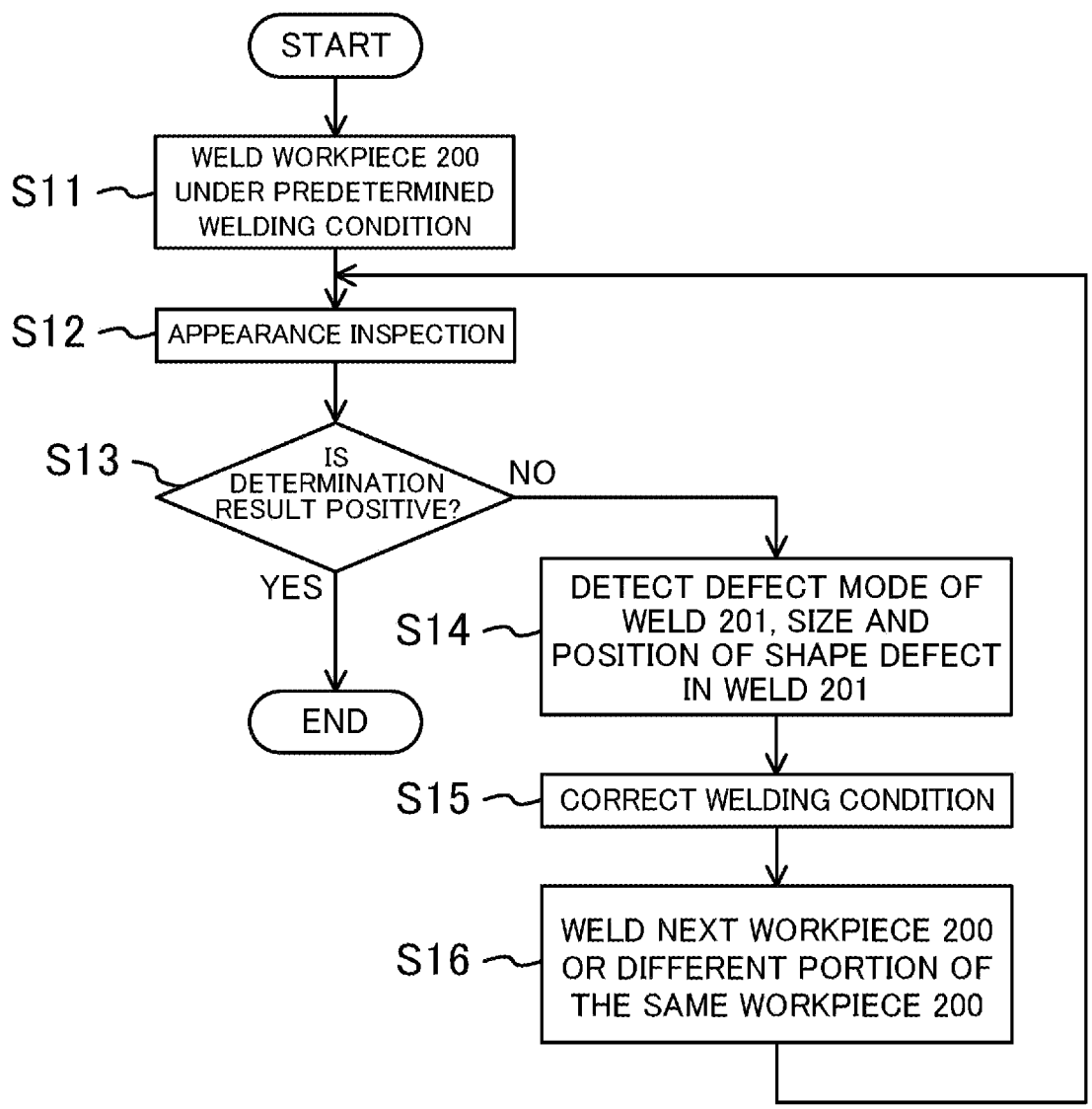
FIG. 5 is a flowchart showing a procedure for welding a workpiece.

FIGS. 4A to 4E show examples of a shape defect at the weld. FIG. 5 shows a flowchart of a procedure for rewelding. FIGS. 4A to 4E respectively show the shape of the weld 201 which is butt welded. FIG. 4A shows the shape in plan view, and FIGS. 4B to 4E show the shape in sections taken along lines IVB-IVB, IVC-IVC, IVD-IVD, and IVE-IVE of FIG. 4A, respectively.

As shown in FIGS. 4A to 4E, when arc welding or laser welding is performed on the workpiece 200, the weld 201 may have various kinds of shape defect depending on various parameters such as poor setting of the welding conditions and poor quality of the workpiece 200 used. For example, the weld 201 may partially melt off (a through hole formed in the workpiece 200 due to partial melting of the weld 201 off the workpiece 200 may be hereinafter referred to as a hole 202), or an undercut 203 may be formed. The undercut 203 means a defective portion that is formed at an edge of a weld bead and is dented from the surface of the workpiece 200. The length, width, and height from the reference plane of the weld 201 may vary from their design values L, W, and H beyond allowable ranges ΔL, ΔW, and ΔH. Further, when droplets (not shown) generated at the tip of the welding wire 12 move to the workpiece 200, some of the droplets or fine particles of molten metal of the workpiece 200 may be scattered to generate the spatters 204. When the workpiece 200 is a galvanized steel sheet, the sheet may partially evaporate at the weld 201 to leave a pit 205. When the workpiece 200 or the welding wire 12 is made of an aluminum-based material, smut 206 may be generated near the weld 201.

The pit 205 opens at the surface of the weld bead, and the smut 206 is a black soot-like product that adheres to the vicinity of the weld bead. The pit 205 and the smut 206, and the above-described hole 202, undercut 203, and spatter 204 are examples of the modes (types) of the shape defect.

As described above, there are various modes of the shape defect of the weld 201, depending on which how to correct the welding condition differs. For example, if the spatters 204 seem to be generated, it is possible to change the feeding speed and amount of the welding wire 12 so that the welding wire 12, with droplets (not shown) formed at its tip, does not come into direct contact with the workpiece 200. It is also possible to change the set current and the set voltage so that the droplets do not excessively grow. Further, if the hole 202 seems to be generated, it is possible to change the set current or the moving speed of the robot arm 16. If the smut 206 seems to be generated, it is possible to change the set current and the flow rate of the shield gas.

Based on the foregoing, a procedure for welding the workpiece 200 will be described below with reference to FIG. 5.

First, the workpiece 200 is welded under a predetermined welding condition (step S11: first welding step), and then the appearance of the weld 201, i.e., the shape of the weld 201, is inspected using the appearance inspection apparatus 20 (step S12: appearance inspection step).

Based on the result of the inspection in step S12, the appearance inspection apparatus determines whether the shape of the weld 201 is good or bad (step S13: shape determination step). If the result of the determination in step S13 is positive, i.e., the shape of the weld 201 is determined to be good, every target portion of the workpiece 200 is welded, and the welding of the workpiece 200 ends. If another workpiece remains to be welded, this workpiece 200 is introduced into the welding system 100 to continue the welding.

If the result of the determination in step S13 is negative, i.e., the shape of the weld 201 is determined to be bad, the feedback unit 29 extracts the shape defect information, that is, the mode of the shape defect of the weld 201, the size of the shape defect, and the position of the shape defect in the weld 201 (step S14: shape defect information extraction step). Based on the result of the extraction in step S14, the output controller 15, more specifically, the optimum condition inference unit 153, corrects the used welding condition to the optimum condition for welding the workpiece 200 (step S15: welding condition correction step).

Subsequently, the welding system 100 welds the next workpiece 200 or a different portion of the same workpiece 200 under the corrected welding condition (step S16: second welding step), and then returns to step S12 to perform appearance inspection of the weld 201. Thereafter, a series of the steps is repeated until the welding of the workpiece 200 is all completed.

[Advantages]

As described above, the welding system 100 of the present embodiment includes the welding apparatus 10 that welds the workpiece 200, and the appearance inspection apparatus that inspects the appearance of the weld 201 of the workpiece 200.

The appearance inspection apparatus 20 at least includes: the shape measurement unit 21 that measures the shape of the weld 201; the image processor 23 that generates image data of the weld 201 based on the data of the shape measured by the shape measurement unit 21; the determination unit 27 that determines whether the shape of the weld 201 is good or bad based on the image data read from the image processor 23; and the feedback unit 29 that extracts the shape defect information including the defect mode of the weld 201 and the size and position of the shape defect in the weld 201 from the result of the determination by the determination unit 27 and the image data read from the image processor 23.

The welding apparatus 10 at least includes the welding head 11 (welding torch 11) that applies heat to the workpiece 200, and the output controller 15 that controls the welding output of the welding head 11 (welding torch 11).

If the determination unit 27 has determined that the shape of the weld 201 is bad, the output controller 15 corrects the welding condition for the workpiece 200 based on the shape defect information extracted by the feedback unit 29.

The welding system 100 configured in this manner can automatically correct the welding condition for the workpiece 200 based on the result of the inspection by the appearance inspection apparatus 20. Since the shape defect information, i.e., the defect mode of the weld 201 and the position and size of the shape defect, is extracted based on the data of the shape measured by the shape measurement unit 21, the extraction of the shape defect information can be more accurate than that by the welder himself/herself, for example. As a result, the data for correcting the welding condition becomes more reliable, and the welding condition can be corrected with high accuracy.

The appearance inspection apparatus 20 further includes: the learning data set generator 25 that classifies the multiple pieces of image data generated by the image processor 23 by material and shape of the workpiece 200 and generates a plurality of learning data sets based on the classified multiple pieces of image data; and the determination model generator 26 that generates the determination model for determining whether the shape of the weld 201 is good or bad for each of the material and shape of the workpiece 200 using the plurality of learning data sets. The learning data set generator 25 generates the learning data sets based on one or more feature values extracted from the image data in the image processor 23.

The appearance inspection apparatus 20 configured in this manner makes it possible to automatically detect the shape defect of the weld 201 without manually setting a complicated criterion for the determination. Since the multiple pieces of image data are classified by material and shape of the workpiece 200 prior to the generation of the learning data sets, the learning data sets can be generated efficiently. Further, since the learning data sets are generated using the feature value extracted from the image data, the processing for generating the learning data sets can be simplified without reducing the accuracy of the determination model.

The learning data set generator 25 may classify the multiple pieces of image data generated by the image processor 23 by inspection item for the weld 201, and may perform the data extension processing on the classified image data to generate the plurality of learning data sets.

The determination model generator 26 may generate the determination model for determining whether the shape of the weld 201 is good or bad for each inspection item of the weld 201 using the plurality of learning data sets.

The appearance inspection apparatus 20 further includes the notification unit 28 that notifies the result of the determination by the determination unit 27.

This allows the welder or the system administrator to know in real time during the welding of the workpiece 200 whether a failure has occurred at the weld 201 or not. If necessary, measures to continue the welding of the workpiece 200 or not can be taken. This can reduce the cost of the welding process.

The output controller 15 of the welding apparatus 10 at least includes: the memory 152 that stores a predetermined welding condition; the optimum condition inference unit 153 that corrects the welding condition based on the shape defect information and stores the corrected welding condition in the memory 152; and the welding condition setting unit 154 that sets a welding condition corresponding to the workpiece 200 to be welded from a plurality of welding conditions stored in the memory 152 including the corrected welding condition.

Since the output controller 15 is configured in this manner, the welding condition can be suitably corrected based on the information of the shape defect that has actually occurred at the weld 201. Further, the welding condition for the workpiece 200 can be corrected at the timing when the shape defect of the weld 201 occurred, which can block the yield of the welding process from decreasing, and can reduce the cost of the welding process.

In a preferred embodiment, the optimum condition inference unit 153 corrects the welding condition through machine learning on the welding condition based on the shape defect information.

The optimum condition inference unit 153 configured in this manner can correct the welding condition with high accuracy, and can easily bring the corrected welding condition close to the optimum condition.

The appearance inspection apparatus 20 may include the memory 24 that stores the image data generated by the image processor 23. In this case, the learning data set generator 25 reads the image data stored in the memory 24 to generate the plurality of learning data sets.

In this way, the generation of the learning data sets and the subsequent processing for generating the determination model can be smoothly performed. The memory 24 may be present outside the data processor 22. For example, the data processor 22 may be provided with an external communication interface to be able to exchange the data with the memory 24 via the external communication interface. The memory 24 may be an external server, for example.

The method for welding the workpiece 200 according to the present embodiment using the above-described welding system 100 includes: a first welding step (step S11) of welding a predetermined portion of the workpiece 200 using the welding apparatus 10 under a predetermined welding condition; and a shape determination step (step S13) of determining whether the shape of the weld 201 of the workpiece 200 is good or bad using the appearance inspection apparatus 20 after the end of the first welding step.

The method for welding the workpiece 200 according to the present embodiment further includes, if the result of the determination in the shape determination step is negative: a shape defect information extraction step (step S14) of extracting the shape defect information of the weld 201; a welding condition correction step (step S15) of correcting the welding condition based on the shape defect information; and a second welding step (step S16) of welding a different portion of the workpiece 200 or a predetermined portion of a different workpiece 200 using the welding apparatus 10 under the corrected welding condition.

According to the present embodiment, the welding condition for the workpiece 200 is corrected based on the result of the determination of whether the shape of the weld 201 is good or bad and the shape defect information. This can improve the accuracy of correction of the welding condition, can improve the yield of the welding process, and can reduce the cost of the welding process. Further, the weld quality can be maintained at a predetermined level or higher.

Second Embodiment

The welding system 100 of the first embodiment is useful not only for correcting the welding condition in use based on the result of the appearance inspection of the weld 201, but also for setting the welding condition for workpieces 200 having no welding record.

Figure 6:
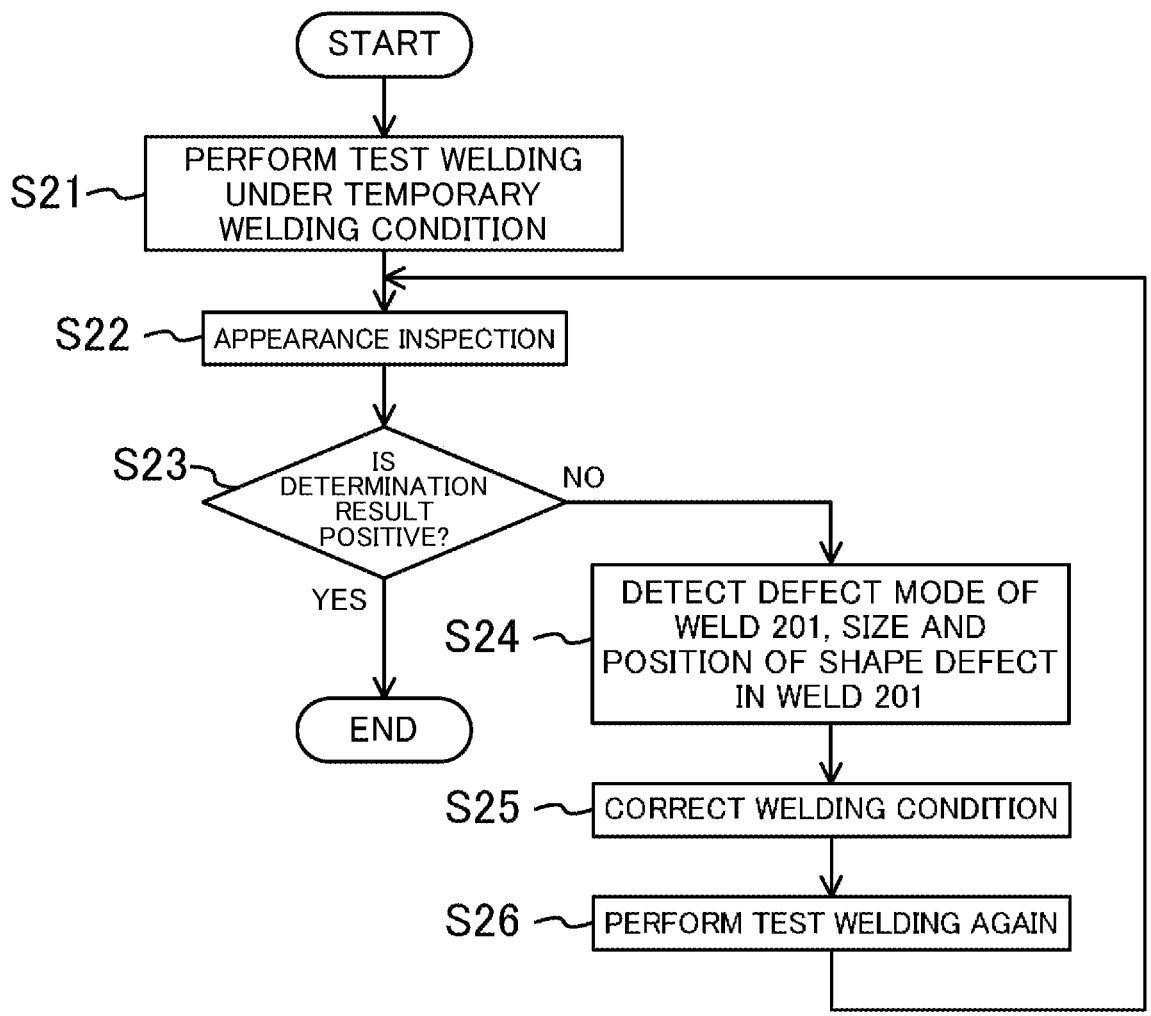
FIG. 6 is a flowchart showing a procedure for setting a welding condition for a workpiece according to a second embodiment of the present invention.

FIG. 6 shows a flowchart of a procedure for setting the welding condition for the workpiece according to the present embodiment.

First, test welding of a workpiece 200 is performed under a temporary welding condition (step S21; first test welding step). In this case, a suitable condition is selected from the welding conditions for similar types of workpieces 200 having past welding records in accordance with the material and shape of the workpiece 200, and parameters considered to be relevant to the shape of the weld are appropriately changed to prepare a plurality of conditions. Specifically, several types of test welding are performed in step S21. Note that the test welding may be performed under a single condition in order to reduce the number of man-hours for setting the conditions.

Steps S22 to S24 are the same as steps S12 to S14, and will not be described in detail below. Note that a plurality of welds 201 are inspected in step S22 according to the temporary welding conditions, and whether the shape of each of the welds 201 is good or bad is determined in step S23. Further, in step S24, the shape defect information is extracted from each of the welds 201 determined to have a bad shape in step S23.

Next, based on the result of the extraction in step S24, the optimum condition inference unit 153 of the output controller 15 corrects the temporary welding condition to the optimum condition for welding the workpiece 200 (step S25: welding condition correction step).

Subsequently, the welding system 100 performs the test welding again under the corrected welding condition (step S26: second test welding step), and returns to step S22 to perform the appearance inspection of the weld 201. Thereafter, a series of steps S22 to S26 is repeated until the result of the determination in step S23 becomes positive.

As described above, the method for welding the workpiece 200 according to the present embodiment using the welding system 100 includes: the first test welding step (step S21) of performing the test welding of the workpiece 200 using the welding apparatus 10 under the temporary welding condition; and the shape determination step (step S23) of determining whether the shape of the weld 201 of the workpiece 200 is good or bad using the appearance inspection apparatus 20 after the end of the first welding step.

The method for setting the welding condition for the workpiece 200 according to the present embodiment further includes, if the result of the determination in the shape determination step is negative: the shape defect information extraction step (step S24) of extracting the shape defect information of the weld 201; the welding condition correction step (step S25) of correcting the temporary welding condition based on the shape defect information; and the second test welding step (step S26) of performing the test welding of the workpiece 200 using the welding apparatus 10 under the corrected welding condition. A series of steps from the shape defect determination step to the second test welding step is repeated until the result of the determination in the shape determination step becomes positive.

According to the present embodiment, the number of man-hours for setting the welding condition to be newly created can be greatly reduced. Since the welding condition actually used for the workpiece 200 can be brought close to the optimum condition from the beginning, the yield of the welding process can be improved, and the cost of the welding process can be reduced. Further, the weld quality can be maintained at a predetermined level or higher.

In the first embodiment, it is assumed that the welding condition is corrected in accordance with the result of the shape inspection of the weld 201 of the workpiece 200 which is to be continuously processed. Therefore, the correction from the initial welding condition is expected to be slight, and the welding condition can be brought close to the optimum condition through a single correction.

On the other hand, in the present embodiment, the temporary welding condition may possibly greatly deviate from the original optimum condition. Therefore, the routine from step S22 to step S26 does not end after repeated once, and may be repeated many times.

Third Embodiment

Figure 7:
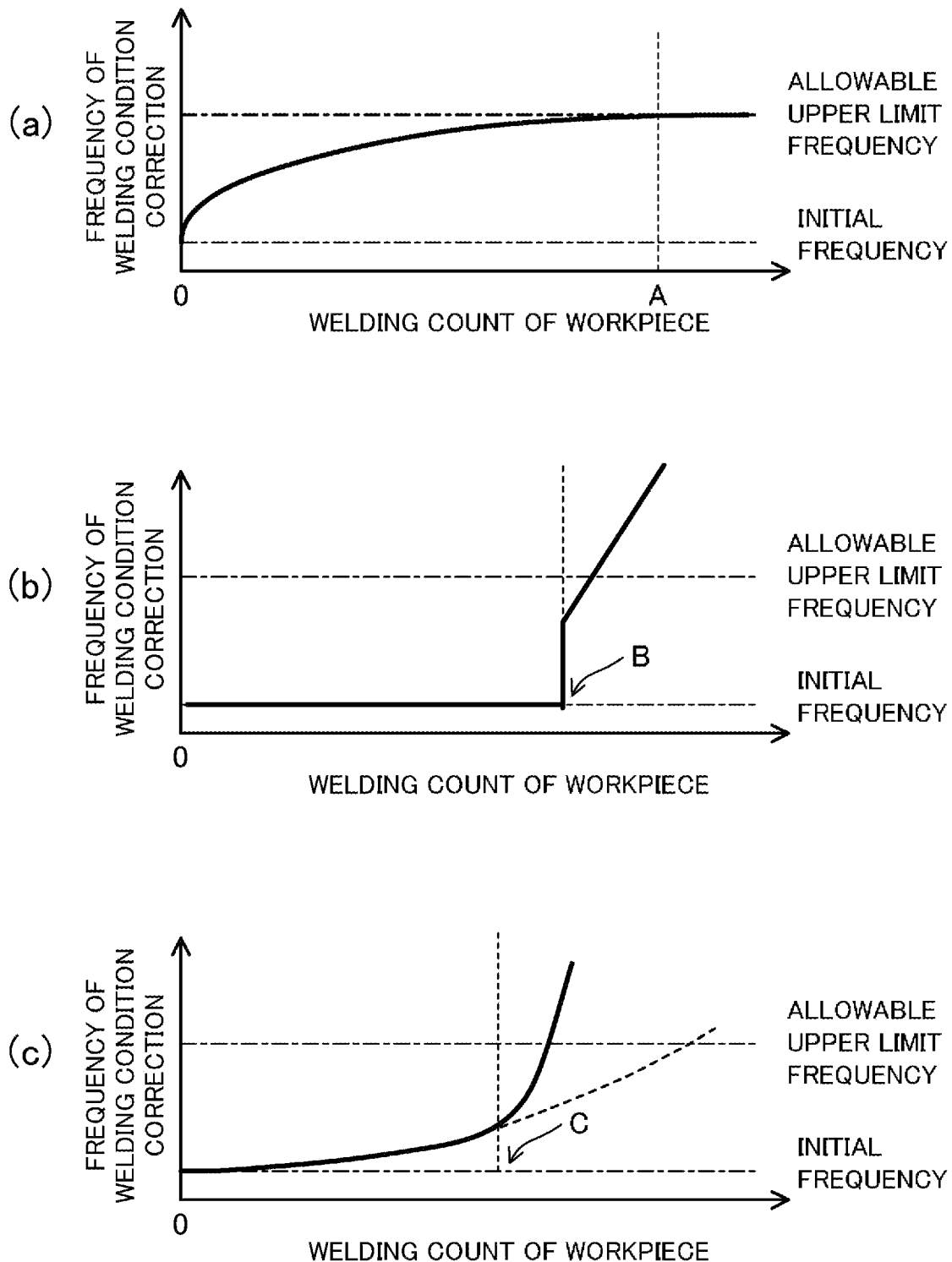
FIG. 7 is a graph showing a relationship between a welding count of a workpiece and a frequency of welding condition correction according to a third embodiment of the present invention.

FIG. 7 shows a relationship between a welding count of the workpiece and a frequency of welding condition correction according to the present embodiment.

In general, the frequency of the welding condition correction tends to increase as the welding count of the workpiece 200 increases. This is because the state of each part of the welding system 100, in particular, the welding apparatus 10, changes as the operating time increases, which increases the frequency of occurrence of the shape defect of the weld 201. For this reason, in general, a plurality of control points are provided for each part of the welding apparatus 10, and an allowable range is set for each control point. For example, a welding current and a welding voltage, which are actual outputs during welding, are also monitored by a detector (not shown).

However, each of various monitors for monitoring the control points is not provided with a mechanism for detecting a failure of the monitor itself. Likewise, each of the components constituting each part of the welding apparatus 10 is not provided with a mechanism for detecting its own failure. Therefore, even if some of the monitors or some of the components of the welding apparatus 10 failed or deteriorated, all the determined control points may appear to be within the allowable ranges. If the workpiece 200 is welded in such a state, poor welding may frequently occur.

In addition, if the states of the workpieces 200 extremely vary from lot to lot, poor welding may frequently occur in a particular lot, even if the workpieces 200 of the same type are continuously processed and all the determined control points of the welding system 100 are within the allowable ranges.

Further, when the welding condition is corrected without taking notice of equipment abnormality of the welding apparatus 10 or the failed lot, the corrected welding condition may actually deviate from the optimum condition.

Therefore, in the present embodiment, if the frequency of the welding condition correction with respect to the welding count of the workpiece 200 is equal to or greater than the allowable upper limit value, or a variation trend of the frequency of the welding condition correction deviates from a predicted variation trend, the welding of the workpiece 200 is interrupted, and the welding system 100 and/or the welded workpiece 200 is inspected.

When the welding system 100 is normally operated, for example, as illustrated in the graph (a) in FIG. 7, the frequency of the welding condition correction gradually increases with the increase in the welding count of the workpiece 200, and reaches the allowable upper limit value at the welding count A. At this point in time, the welding system 100 is inspected, and a failed or deteriorated part is repaired. Thus, the occurrence of the poor welding can be reduced.

On the other hand, as shown in the graph (b) in FIG. 7, an abrupt increase of the frequency of the welding condition correction with respect to the welding count of the workpiece 200 at the welding count B indicates high possibility that the welding system 100 has suddenly failed or a failed lot has been processed. In this case, inspection of the welding system 100 and/or the welded workpiece 200 can reduce the occurrence of the poor welding.

Further, as shown in the graph (c) in FIG. 7, also when the frequency of the welding condition correction with respect to the welding count of the workpiece 200 deviates from a prediction curve indicated by a broken curve after the welding count C, it is considered that some failure has occurred in the welding system 100 or the workpiece 200. Then, inspection of the welding system 100 and/or the welded workpiece 200 is performed. This can reduce the occurrence of the poor welding.

According to the present embodiment, the welding condition can be blocked from being excessively corrected, and the workpiece 200 can be stably welded.

The welding count of the workpiece 200 may be recognized as cumulative welding time of the workpiece 200. Further, the frequency of the welding condition correction may be recognized as a frequency of occurrence of the shape defect of the weld 201 of the workpiece 200.

Other Embodiments

It has been described in the first embodiment that the shape measurement unit 21 is attached to the robot arm 30. However, the shape measurement unit 21 may be attached to the welding torch 11 or the robot arm 16. This can reduce the items of equipment of the welding system 100, and can reduce the cost of the welding system 100. In this case, it is needless to say that the robot controller 17 controls the operation of the robot arm 16, thereby successively performing the welding and appearance inspection of the workpiece 200.

The learning data set generator 25 of the appearance inspection apparatus 20 may perform data extension processing on the image data read from the memory 24 to generate the learning data sets. For example, the data extension processing is performed through changing one or more feature values associated with the image data and/or changing the position of the shape defect in the image data.

With the appearance inspection apparatus 20 configured in this way, a required amount of learning data sets can be generated based on a small amount of image data, and the determination model can be provided with enhanced accuracy. Thus, whether the shape of the weld 201 is good or bad can be accurately determined. Further, it is no longer necessary to acquire a large amount of image data for learning, and the number of man-hours required for determining whether the shape is good or bad can be significantly reduced. As long as the required amount of learning data for improving the accuracy of the determination model is acquired, the data extension processing does not need to be performed on all the image data read from the memory 24, and may be performed on some required data only.

As described above, the determination model is represented as a combination of a plurality of discriminators. Therefore, as indicated by broken arrows in FIG. 2A, the determination model that has been generated by the determination model generator 26 and completed predetermined learning, that is, the configuration of each discriminator and patterns of combination of the discriminators, may be stored in the memory 24. In this case, the determination model generator 26 may read information about the configuration of the determination model corresponding to the inspection item for which the determination is made from the memory 24, and may reconstruct the determination model. This makes it possible to easily cope with the case where the number of determination models to be used increases with an increase in number of the inspection items.

It has been described in the first and second embodiments that the feedback unit 29 is provided for the data processor 22 of the appearance inspection apparatus 20. However, the feedback unit 29 may be provided for the output controller 15. In this case, the result of the determination by the determination unit 27 may be received by the receiver 151 of the output controller 15 via the notification unit 28.

FIG. 2A shows an example in which the image data is directly transmitted from the image processor 23 to the feedback unit 29. However, the flow of data has been merely described as an example for convenience of explanation, and is not particularly limited thereto. For example, the image data may be directly transmitted from the determination unit 27 to the feedback unit 29. The result of the determination by the determination unit 27 may be directly transmitted to the feedback unit 29.

Further, the appearance inspection apparatus 20 may have no determination model generator 26. Instead, the memory 24 may store the criterion set for each inspection item for the weld 201, and the determination unit 27 may determine whether the shape of the weld 201 is good or bad based on the shape defect information and the criterion stored in the memory 24. Even in this case, a predetermined determination accuracy is ensured if the number of inspection items is small and the criterion is moderate.

The welding system of the present invention can automatically and accurately correct the welding condition for the workpiece, and is advantageously applied to a welding system that performs automated welding.

What is claimed is:

1. A welding system comprising: a welding apparatus that welds a workpiece; and an appearance inspection apparatus that inspects an appearance of a weld of the workpiece, wherein
the appearance inspection apparatus at least includes:
a shape measurement unit that measures a shape of the weld;
an image processor that generates image data of the weld based on data of the shape measured by the shape measurement unit;
a determination unit that determines whether the shape of the weld is good or bad based on the image data read from the image processor; and
a feedback unit that extracts shape defect information including a defect mode of the weld and a size and position of the shape defect in the weld based on a result of the determination by the determination unit and the image data read from the image processor,
the welding apparatus at least includes:
a welding head that applies heat to the workpiece; and
an output controller that controls a welding output of the welding head, and
if the determination unit has determined that the shape of the weld is bad, the output controller corrects a welding condition for the workpiece based on the shape defect information extracted by the feedback unit.

2. The welding system of claim 1, wherein
the image data includes multiple pieces of image data,
the appearance inspection apparatus includes:
a learning data set generator that classifies the multiple pieces of image data generated by the image processor by material and shape of the workpiece, and generates a plurality of learning data sets based on the classified multiple pieces of image data; and
a determination model generator that generates one or more determination models for determining whether the shape of the weld is good or bad for each of the material and shape of the workpiece using the plurality of learning data sets,
the learning data set generator generates the learning data sets based on one or more feature values extracted from the image data in the image processor, and
the determination unit determines whether the shape of the weld is good or bad based on the image data read from the image processor and the one or more determination models generated by the determination model generator.

3. The welding system of claim 1, wherein
the appearance inspection apparatus further includes a notification unit that notifies a result of the determination by the determination unit.

4. The welding system of claim 1, wherein
the output controller at least includes:
a memory that stores a predetermined welding condition;
an optimum condition inference unit that corrects the welding condition based on the shape defect information, and stores the corrected welding condition in the memory; and
a welding condition setting unit that sets a welding condition corresponding to the workpiece to be welded from the welding condition and the corrected welding condition stored in the memory.

5. The welding system of claim 4, wherein
the optimum condition inference unit corrects the welding condition through machine learning on the welding condition based on the shape defect information.

6. A method for welding a workpiece using the welding system of claim 1, the method comprising:
- a first welding step of welding a predetermined portion of the workpiece using the welding apparatus under a predetermined welding condition; and
- a shape determination step of determining whether a shape of a weld of the workpiece is good or bad using the appearance inspection apparatus after the end of the first welding step,
- the method further comprising, if a result of the determination in the shape determination step is negative: a shape defect information extraction step of extracting the shape defect information of the weld;
- a welding condition correction step of correcting the welding condition based on the shape defect information; and
- a second welding step of welding a different portion of the workpiece or the predetermined portion of a different workpiece using the welding apparatus under the corrected welding condition.

7. The method for welding the workpiece of claim 6, wherein
- if a frequency of welding condition correction with respect to a welding count or cumulative welding time of the workpiece is equal to or greater than a predetermined value, or a variation trend of the frequency of the welding condition correction deviates from a predicted variation trend, the welding of the workpiece is interrupted, and the welding system and/or the welded workpiece is inspected.

* * * * *